(12) United States Patent
Yasuda (10) Patent No.: US 10,113,505 B2
(45) Date of Patent: Oct. 30, 2018

(54) GASKET AND ENGINE WITH THE GASKET

(71) Applicant: ISHIKAWA GASKET CO., LTD., Minato-ku, Tokyo (JP)

(72) Inventor: Kisho Yasuda, Tokyo (JP)

(73) Assignee: ISHIKAWA GASKET CO., LTD., Tokyo (JP)

( * ) Notice: Subject to any disclaimer, the term of this patent is extended or adjusted under 35 U.S.C. 154(b) by 410 days.

(21) Appl. No.: 14/807,492

(22) Filed: Jul. 23, 2015

(65) Prior Publication Data

US 2015/0330330 A1   Nov. 19, 2015

Related U.S. Application Data

(63) Continuation of application No. 13/975,998, filed on Aug. 26, 2013, now Pat. No. 9,188,080.

(30) Foreign Application Priority Data

Dec. 7, 2012   (JP) ................. 2012-268119

(51) Int. Cl.
*F02F 11/00* (2006.01)
*F16J 15/08* (2006.01)

(52) U.S. Cl.
CPC ......... *F02F 11/002* (2013.01); *F16J 15/0818* (2013.01); *F16J 15/0825* (2013.01); *F16J 2015/085* (2013.01); *F16J 2015/0868* (2013.01)

(58) Field of Classification Search
CPC .... F16J 15/0818; F16J 15/0825; F16J 15/024; F16J 15/123
See application file for complete search history.

(56) References Cited

U.S. PATENT DOCUMENTS

| | | | | | |
|---|---|---|---|---|---|
| 1,782,087 | A | * | 11/1930 | Bailey | F16J 15/123 |
| | | | | | 277/597 |
| 1,839,336 | A | * | 1/1932 | Oven | F16J 15/123 |
| | | | | | 277/598 |
| 3,794,333 | A | * | 2/1974 | Czernik | F16J 15/123 |
| | | | | | 277/593 |
| 4,088,347 | A | * | 5/1978 | Bruggemann | F01N 13/1805 |
| | | | | | 277/598 |
| 5,653,451 | A | * | 8/1997 | Udagawa | F16J 15/0825 |
| | | | | | 277/595 |
| 6,189,895 | B1 | * | 2/2001 | Yamada | F02F 11/00 |
| | | | | | 277/591 |

(Continued)

*Primary Examiner* — Vishal A Patel
(74) *Attorney, Agent, or Firm* — Manabu Kanesaka (57) ABSTRACT

A gasket clamped between two members fastened by a fixture, includes first and second metal plates laminated together to form the gasket, fixture holes formed in the first and second metal plates for inserting the fixture therein, sealing subject holes formed in the first and second metal plates, fastening-stress concentration areas located on the first and second metal plates between the fixture holes and the sealing subject holes where a fastening stress concentrates when the two members are fastened by the fixture, and a linear bead formed on the first metal plate only at the fastening-stress concentration area to reduce the fastening stress when the two members are fastened. The linear bead projects to a side opposite to the second metal plate, and is disposed on an axis line connecting a center of the fixture hole and a center of the sealing subject hole in the first metal plate.

4 Claims, 6 Drawing Sheets (56) References Cited

U.S. PATENT DOCUMENTS

| | | | | |
|---|---|---|---|---|
| 8,109,520 B2* | 2/2012 | Imai | ............... | F16J 15/0818 |
| | | | | 277/593 |
| 8,336,889 B2* | 12/2012 | Unseld | ............ | F16J 15/0818 |
| | | | | 277/593 |
| 2009/0072493 A1* | 3/2009 | Duckek | ............ | F16J 15/0818 |
| | | | | 277/593 |
| 2009/0184478 A1* | 7/2009 | Imai | ............... | F16J 15/0825 |
| | | | | 277/593 |
| 2010/0164185 A1* | 7/2010 | Unseld | ............ | F16J 15/0818 |
| | | | | 277/596 |

* cited by examiner

·········  Valley fold  ⎫
— - —  Mountain fold  ⎬  Beads
                       ⎭

— —  Axis line / Tangent lines

▨  Stress concentration areas

GASKET AND ENGINE WITH THE GASKET

BACKGROUND OF THE INVENTION AND RELATED ART STATEMENT

The present invention relates to a gasket clamped between two members fastened by fixtures to seal a sealing subject hole, and an engine with the gasket.

In order to improve fuel consumption, in a recent engine (internal combustion), both a cylinder block and a cylinder head are formed by a lighter material, for example, aluminum and the like, or a thickness is thinly formed and the like so as to be made lighter. As a result, both the cylinder block and the cylinder head have a low rigidity.

When such a cylinder block and cylinder head are tightened by a high head-bolt axial force by clamping the cylinder head gasket for sealing a combustion gas inside a cylinder bore, coolant water inside a water jacket, and lubricant oil, since a thickness of an upper face of the cylinder block is thin, there acts a force pulling up the cylinder block near an end of a head bolt. Also, at the same time, near the sealing subject hole such as the cylinder bore and the like, there also acts a force pushing down on the cylinder block by a surface pressure of the cylinder head gasket. As a result, a stress at a periphery of the water jacket or at a periphery of the cylinder bore increases locally, and there is a problem that the cylinder bore or a cylinder liner inserted into the cylinder bore is distorted or deformed.

Especially, in a case of a closed-deck-type cylinder block, the head bolt and the cylinder bore are connected without opening, so that the stress at the periphery of the water jacket or at the periphery of the cylinder bore of the relevant portion increases. Accordingly, a distortion or a deformation of the cylinder bore or the cylinder liner tends to occur.

If the cylinder bore or the cylinder liner is distorted or deformed, and is no longer capable of maintaining a circular shape, an unnecessary resistance is generated between the cylinder bore or the cylinder liner, and a piston carrying out a piston movement inside the cylinder bore; thereby the fuel consumption is deteriorated. Also, the lubricant oil flows into the cylinder bore, and the lubricant oil burns so as to cause adverse effects on an exhaust gas.

Figure 6:
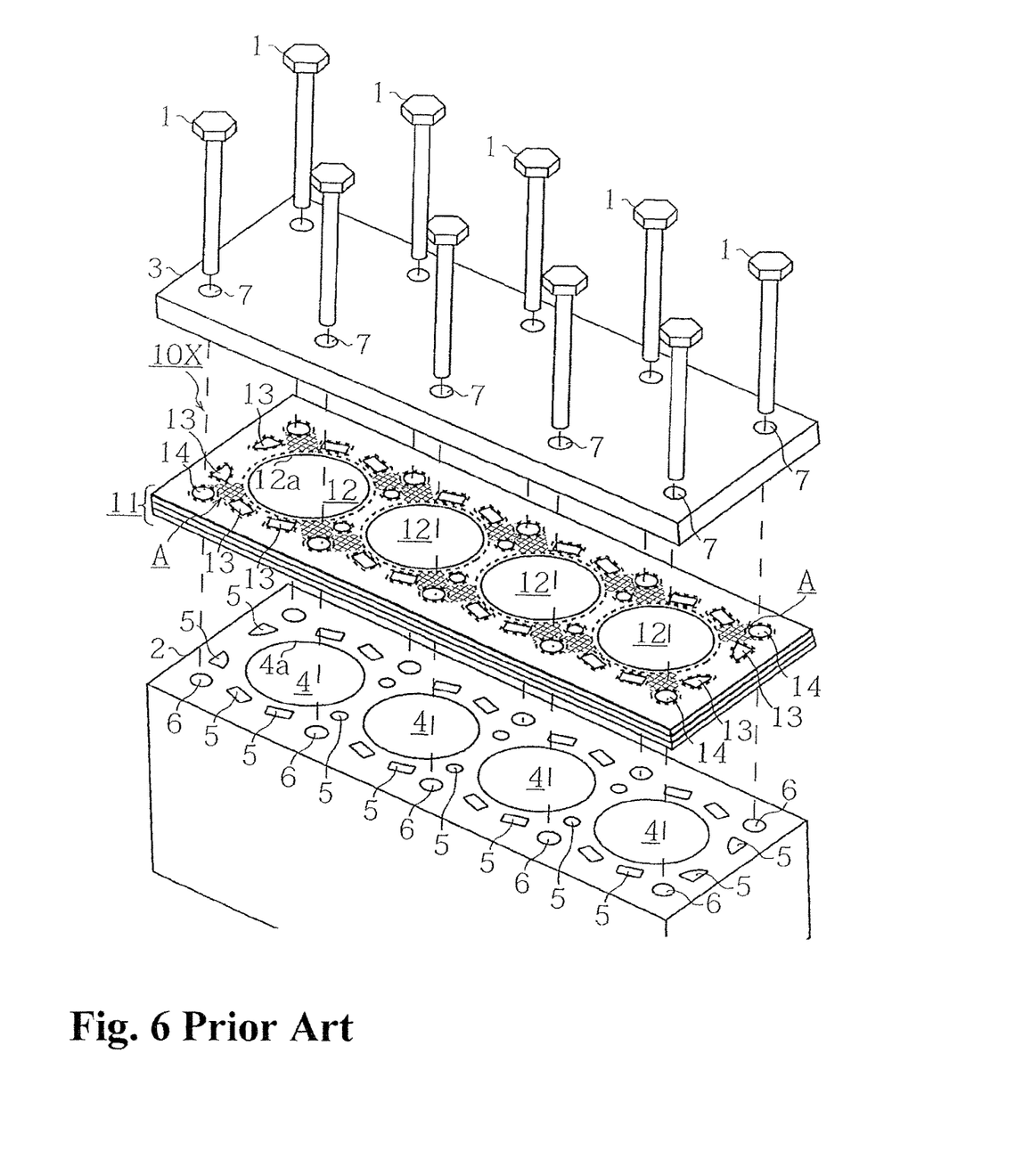
FIG. 6 is an exploded perspective view showing a conventional cylinder head gasket, and an engine wherein the cylinder head gasket thereof is clamped between the cylinder block and the cylinder head.

Here, a conventional cylinder head gasket will be explained with reference to FIG. 6. A cylinder head gasket 10X is the gasket clamped between a cylinder block 2 and a cylinder head 3 fastened by head bolts 1, and sealing cylinder bores 4, water jackets 5, and a hole for the lubricant oil which is not shown in the figure. The cylinder head gasket 10X is the gasket used for, i.e., the closed-deck-type cylinder block 2 wherein all upper faces of the water jackets 5 are not open.

Figure 7:
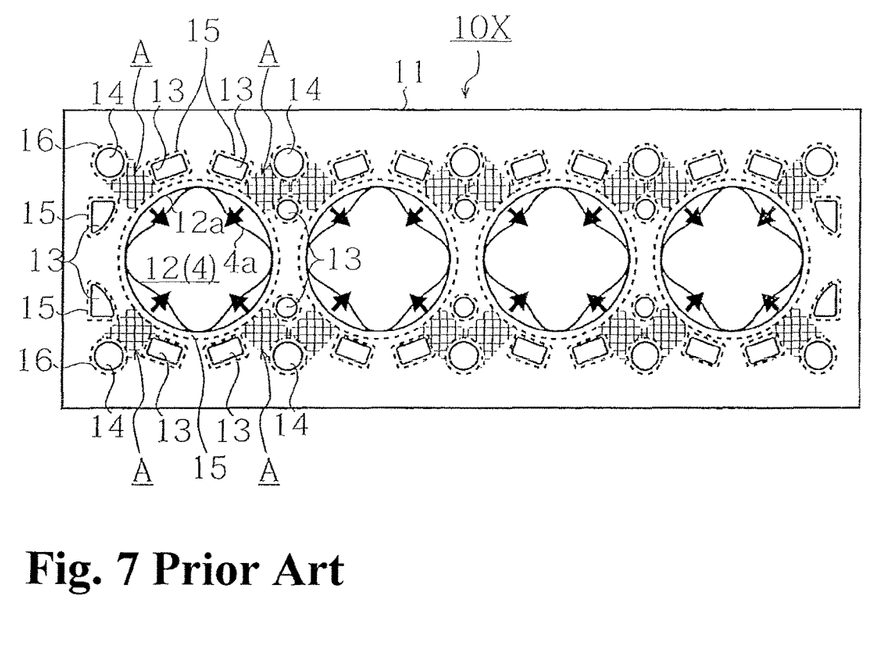
FIG. 7 is an enlarged plan view showing an area where a fastening stress of the cylinder head gasket in FIG. 6 concentrates.

The cylinder head gasket 10X comprises cylinder-bore holes 12, water holes 13, and bolt holes 14 in a substrate 11 formed by laminating a plurality of metal plates. As shown in FIG. 7, in respective circumferential edge portions thereof, there are provided cylinder-bore hole beads 15, water hole beads 16, and bolt hole beads 17.

The cylinder head gasket 10X is clamped between the cylinder block 2 and the cylinder head 3, and the head bolts 1 are inserted and passed through the bolt holes 6, 7, and 14 so as to fasten the cylinder block 2 and the cylinder head 3. At that time, the cylinder block 2 and the cylinder head 3 are fastened by the high head-bolt axial force to allow the cylinder head gasket 10X to reliably seal the combustion gas inside the cylinder bores 4, the coolant water inside the water jackets 5, and the lubricant oil.

In a case of being fastened by the high head-bolt axial force in this manner, a fastening stress concentrates in areas (hereinafter, these portions are called fastening-stress concentration areas A) shown by A in the figure, and as mentioned above, the stress increases in these portions. Then, as a result, as shown in FIG. 7, inner circumferential faces 4a of the cylinder bores 4 are distorted, or the cylinder liner which is not shown in the figure is distorted.

With respect to the aforementioned problem, there is proposed a device wherein an end-surface pressure adjusting portion is provided in a gasket main body, which can press against a deck surface of the cylinder block and a deck surface of the cylinder head on an outside further than an end-portion bolt line connecting centers of a pair of bolt insertion holes lining up in a width direction of the engine at both end portions in a cylinder line direction, or in both end portions in the cylinder line direction (for example, see Japanese Patent Application Publication No. 2005-23773).

The aforementioned device can solve the problem that by the surface pressure receiving from the cylinder head gasket, the cylinder bore of each cylinder is deformed to bulge, so that if a surface pressure distribution is uneven, a deformation amount of the cylinder bore becomes also uneven so as to impair a circularity of the cylinder bore. Accordingly, the deformation of the cylinder bore relevant to the cylinder line direction can be controlled.

However, as mentioned above, when the cylinder block and the cylinder head are fastened, the fastening-stress concentration areas wherein the fastening stress thereof concentrates are generally disposed in a radial direction relative to the cylinder bore. Therefore, the deformation of the cylinder bore occurs not only in the cylinder line direction.

Also, the surface pressure distribution in a whole area of the gasket is made symmetrical in a right-and-left direction so as to control the deformation of the gasket cylinder bore in the cylinder line direction. However, there is no effect on the deformation of each cylinder bore due to the fastening stress in the fastening-stress concentration areas present in an outer circumference of each cylinder bore, and the distortion or the deformation of each cylinder bore cannot be controlled.

The present invention is made in view of the aforementioned problem, and an object of the present invention is to provide a gasket and a cylinder head gasket which can reduce the fastening stress generated when the two members are fastened by the fixture, and control the distortion, the deformation, or the like due to the fastening stress.

Further objects and advantages of the invention will be apparent from the following description of the invention.

SUMMARY OF THE INVENTION

In order to attain the above-mentioned object, a gasket of the present invention is clamped between two members fastened by fixtures, and seals a sealing subject hole. When the two members are fastened by the fixtures, in a fastening-stress concentration area wherein a fastening stress concentrates between a fixture hole, in which the fixture is inserted and passed through, and the sealing subject hole, the gasket of the present invention includes a fastening-stress reduction portion extending only in the fastening-stress concentration area.

According to the configuration, the fastening-stress reduction portion is formed in the fastening-stress concentration area where the fastening stress is generated when the two members are fastened by the fixture, the fastening stress thereof is reduced to control a distortion, a deformation, or the like of an inner circumference of the sealing subject hole. Thereby, without hindering a movement of a device or a fluid passing through the sealing subject hole, the sealing subject hole can be reliably sealed.

Incidentally, the gasket is a cylinder head gasket clamped between a cylinder block and a cylinder head, an intake-and-exhaust-system gasket provided in a joint line between a pipe arrangement and a pipe arrangement, and the like. Also, the term fastening-stress reduction portion extends only in the fastening-stress concentration area, and indicates beads except for seal beads provided around the sealing subject hole, or a shim. The fastening-stress reduction portion is configured so as not to block a surface pressure into the seal beads.

Also, in the aforementioned gasket, preferably, the fastening-stress concentration area is made as an area enclosed by two tangent lines of the fixture hole parallel to an axis line connecting a center of the fixture hole and a center of the sealing subject hole; an outer edge of the fixture hole; and an outer edge of the sealing subject hole so as to be effective.

Additionally, in the aforementioned gasket, preferably, the fastening-stress reduction portion is configured by fastening-stress reduction beads linearly formed, and also is disposed on the axis line connecting the center of the fixture hole and the center of the sealing subject hole so as to have an excellent working property.

Within a range of the fastening-stress concentration area, a cross-sectional shape thereof or the number of the fastening-stress reduction portion is not specially limited. However, preferably, there may be provided the fastening-stress reduction beads within the range of the fastening-stress concentration area, which extend radially relative to the sealing subject hole. More preferably, the fastening-stress reduction beads, whose cross-sectional shape is an arbitrary shape and which are formed in a linear shape, may be provided on the axis line connecting the center of the fixture hole and the center of the sealing subject hole.

Moreover, in the cylinder head gasket of the present invention for solving the aforementioned object, the aforementioned gasket is formed by a plurality of metal plates, and is configured by being clamped between the cylinder block and the cylinder head.

According to the structure, the fastening-stress reduction portion is provided within the range of the fastening-stress concentration area, so that in a case wherein the cylinder block and the cylinder head are fastened by a high head-bolt axial force, the fastening-stress reduction portion, provided between a head bolt (the fixture) and a cylinder bore (the sealing subject hole), becomes a resistance not allowing the cylinder block to be distorted. Thereby, the distortion or the deformation of the cylinder bore or a cylinder liner due to the fastening stress can be controlled.

In a case of the cylinder block having a lightweight and a low rigidity, when the cylinder block is fastened by the high head-bolt axial force, since a thickness of an upper surface is thin, there acts a force pulling up an inner circumferential surface of the cylinder block, and a stress at a periphery of a water jacket or at a periphery of the cylinder bore increases locally. Especially, in a case of a closed-deck-type cylinder block, the head bolt and the cylinder bore are connected so as to increase the stress of the relevant portion.

In the present invention, the stress at the periphery of the water jacket or at the periphery of the cylinder bore is reduced, so that the distortion or the deformation of the cylinder bore or the cylinder liner can be controlled. Thereby, a movement of a piston inside a cylinder due to the distortion or the deformation of the cylinder bore or the cylinder liner is not hindered so as to be capable of improving fuel consumption. Also, an inflow of lubricant oil or water into an inside of the cylinder bore can be prevented.

According to the present invention, the fastening stress generated when the two members are fastened by the fixture is reduced, and the distortion, the deformation, and the like due to the fastening stress can be controlled.

Especially, the fastening stress of the closed-deck-type cylinder block is reduced, and the distortion, the deformation, and the like of the cylinder bore can be controlled. Thereby, a shape of the cylinder bore and the cylinder liner is maintained, and an unnecessary resistance is not allowed to be generated in the cylinder bore and the cylinder so as to be capable of improving the fuel consumption.

DETAILED DESCRIPTION OF PREFERRED EMBODIMENTS

Hereinafter, a gasket and a cylinder head gasket of an embodiment according to the present invention will be explained with reference to drawings. Incidentally, in FIGS. 1 to 7, sizes are changed for the sake of explanation of a configuration, and sizes of a dimension of a cylinder-bore hole, a water hole, a thickness of beads, a shape, and the like do not necessarily correspond to a ratio of actual manufactured ones.

Also, as the embodiment, FIGS. 1 to 4(d) explain the cylinder head gasket used for an in-line four-cylinder engine as an example. However, as for an engine to which the present invention can be applied, the number of cylinders and an array thereof are not limited. Also, in the present invention, especially a closed-deck type wherein a water jacket portion is not all open exerts the most effect. However, the present invention can be applied to an open-deck type as well.

Figure 5A:
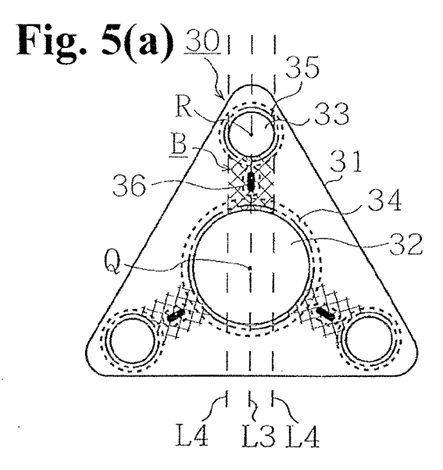
FIGS. 5(a) and 5(b) are plan views showing an intake-and-exhaust-system gasket of the embodiment according to the present invention, and show the intake-and-exhaust-system gasket having respectively different shapes.
Figure 5B:
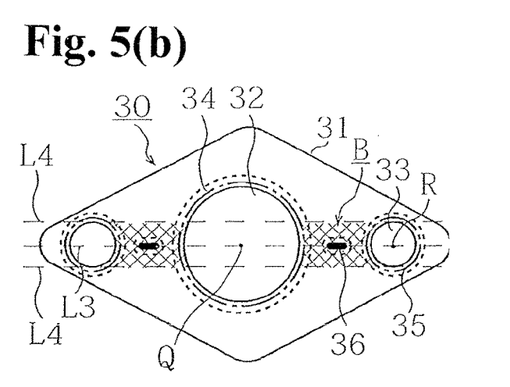

Moreover, for the embodiment, FIGS. 5(a) and 5(b) explain an intake-and-exhaust-system gasket as an example. The term intake-and-exhaust-system gasket here indicates a gasket which is provided in a joint line between a pipe arrangement and a pipe arrangement of a muffler, a manifold, and the like.

Figure 1:
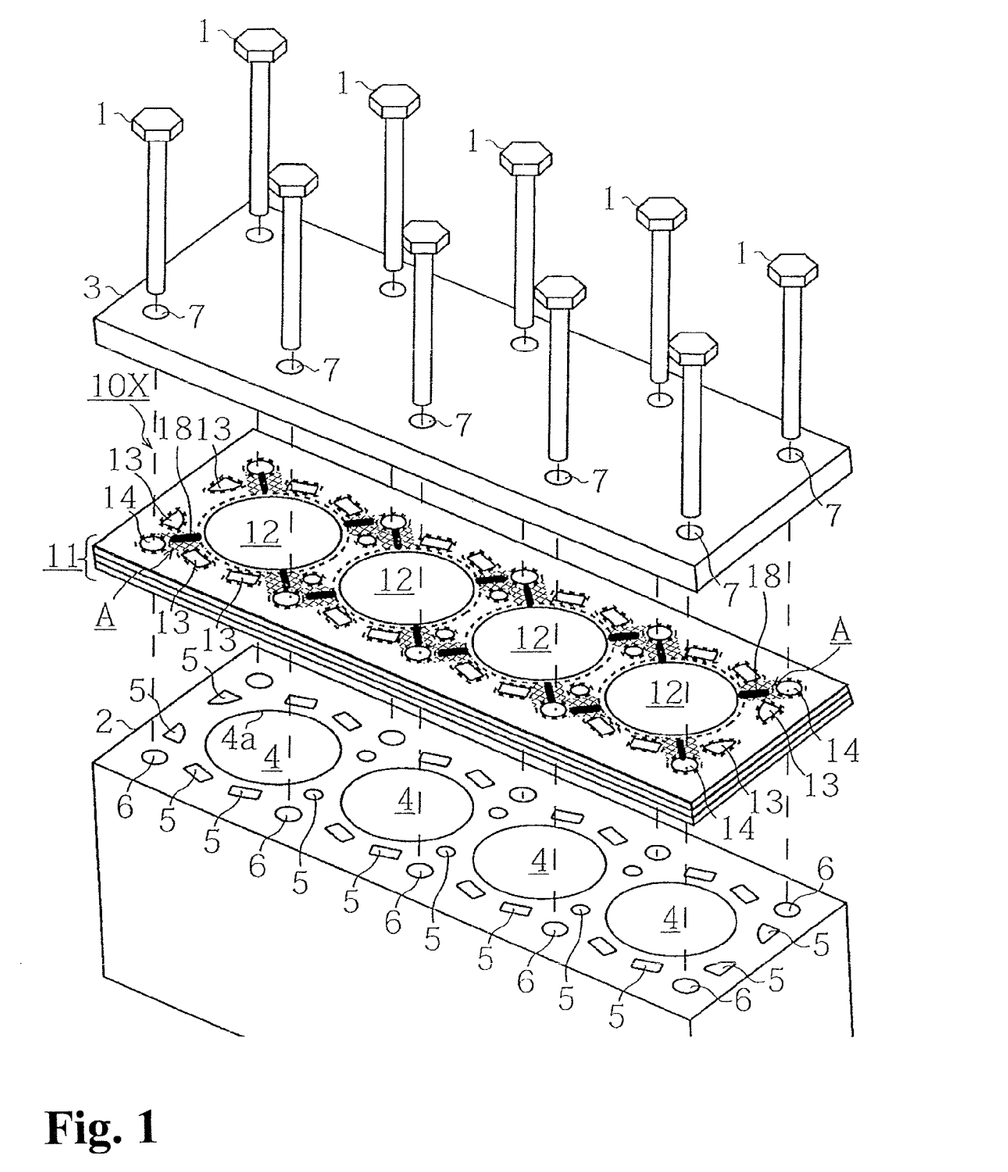
FIG. 1 is an exploded perspective view showing a cylinder head gasket of an embodiment according to the present invention, and an engine clamping the cylinder head gasket thereof between a cylinder block and a cylinder head.

A cylinder head gasket 10 of the embodiment according to the present invention will be explained with reference to FIGS. 1 to 4(d). The cylinder head gasket 10 is formed in a configuration of a conventional cylinder head gasket 10X shown in FIG. 6. As shown in FIG. 1, when a cylinder block 2 and a cylinder head 3 (two members) are fastened by head bolts (fixtures) 1, in fastening-stress concentration areas A wherein a fastening stress concentrates between bolt holes (fixture holes) 14, through which the head bolts 1 pass, and cylinder-bore holes (sealing subject holes) 12, there are provided fastening-stress reduction beads (fastening-stress reduction portions) 18 extending only in the fastening-stress concentration areas A.

Figure 2:
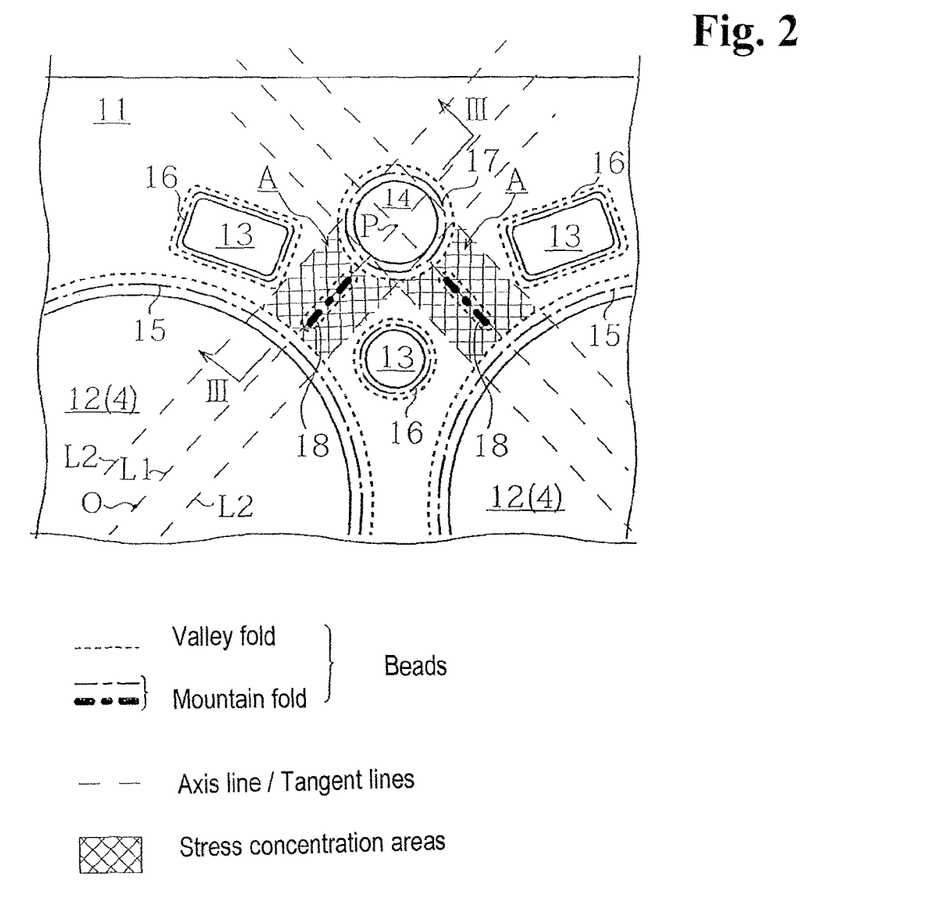
FIG. 2 is an enlarged plan view showing fastening-stress concentration areas of the cylinder head gasket in FIG. 1.

Here, the fastening-stress concentration areas A will be explained. As shown in FIG. 2, the fastening-stress concentration areas A are areas wherein the fastening stress concentrates when the cylinder block 2 and the cylinder head 3 are fastened by the head bolts 1. Specifically, the fastening-stress concentration areas A are the areas between the cylinder-bore holes 12 and the bolt holes 14, and are the areas enclosed by two bolt-hole tangent lines L2 of the bolt hole 14 parallel to a head-bolt axis line L1 connecting a center (the center of a cylinder bore 4) O of the cylinder-bore hole 12, and a center P of the bolt hole 14; an outer circumferential edge (in a case of the embodiment, indicating cylinder-bore hole beads 15) of the cylinder-bore hole 12; and an outer circumferential edge (in the case of the embodiment, indicating bolt hole beads 17) of the bolt hole 14.

Generally, around each cylinder bore 4 provided in the cylinder block 2, there is provided a plurality of bolt holes 6. In the embodiment, there are provided four bolt holes 6 relative to one cylinder bore 4. Therefore, each cylinder-bore hole 12 is enclosed by four fastening-stress concentration areas A, and when the cylinder block 2 and the cylinder head 3 are fastened by the head bolts 1, stresses at a periphery of water jackets 5 and at a periphery of the cylinder bores 4 increase locally in the respective four fastening-stress concentration areas A.

In the present invention, in order to control a distortion or a deformation of each cylinder bore 4, there are provided the fastening-stress reduction beads 18 in all respective fastening-stress concentration areas A (in the embodiment, since there are four fastening-stress concentration areas A relative to one cylinder bore, there are sixteen fastening-stress concentration areas A).

The fastening-stress reduction beads 18 are the beads except for seal beads such as the cylinder-bore hole beads 15; water hole beads 16; the bolt hole beads 17; and the like, and are the beads extending only inside the fastening-stress concentration areas A. In the fastening-stress reduction beads 18, a cross-sectional shape thereof or a shape in a plan view are not specially limited. Also, the fastening-stress reduction beads 18 do not contribute to the cylinder-bore hole beads 15 provided around the cylinder-bore hole 12; the water hole beads 16 provided around the water hole 13; and the bolt hole beads 17 provided around the bolt hole 14, and are configured not to block a surface pressure of each of the beads 15 to 17.

Figure 3A:
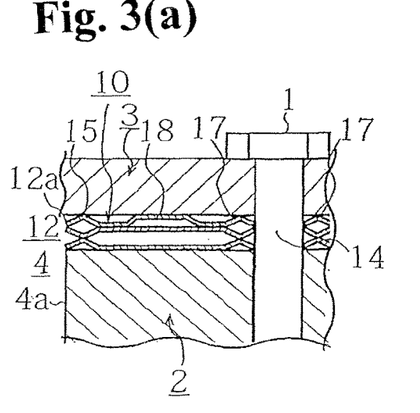
FIGS. 3(a) and 3(b) are cross-sectional views taken along III-III in FIG. 2.
Figure 3B:
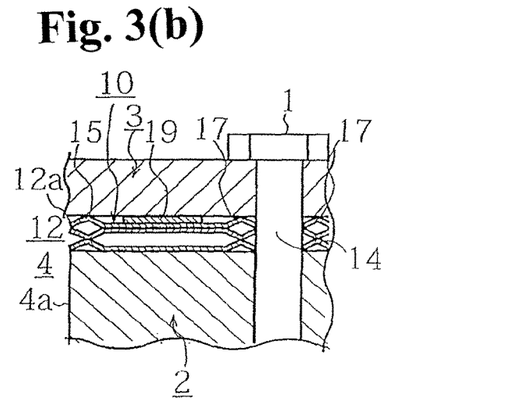

In the embodiment, as shown in FIG. 3(a), as the fastening-stress reduction portions, there are provided the fastening-stress reduction beads 18 formed in a convex type toward the cylinder head 3, and the fastening stress of the fastening-stress concentration areas A is reduced. However, in place of the fastening-stress reduction beads 18, for example, as shown in FIG. 3(b), on a substrate 11 formed by a plurality of metal plates, there may be provided a fastening-stress reduction shim 19 which can press against the cylinder head 3 when the cylinder block 2 and the cylinder head 3 are fastened by the head bolts 1.

Also, the cross-sectional shape, and the shape in the plan view of the fastening-stress reduction beads 18, the number of the fastening-stress reduction beads 18 provided in one fastening-stress concentration area A, and the like are not specially limited. For example, as fastening-stress reduction beads 21 in FIG. 4(a), the fastening-stress reduction beads 21 may be provided by displacing the fastening-stress reduction beads 21 from the head-bolt axis line L1. In that case, relative to the head-bolt axis line L1, the fastening-stress reduction beads 21 are disposed to have a predetermined angle, or may be disposed not to intersect with the head-bolt axis line L1. Also, as fastening-stress reduction beads 22 in FIG. 4(b), the fastening-stress reduction beads 22 may be formed in a polygonal shape, and may be formed in various shapes such as a circular shape, an oval shape, and the like besides the polygonal shape.

Figure 4A:
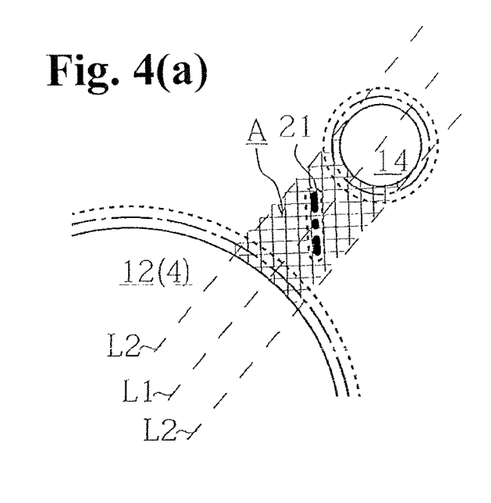
FIGS. 4(a) to 4(d) are enlarged views showing fastening-stress reduction beads of the cylinder head gasket in FIG. 1, and show the fastening-stress reduction beads having respectively different shapes.
Figure 4B:
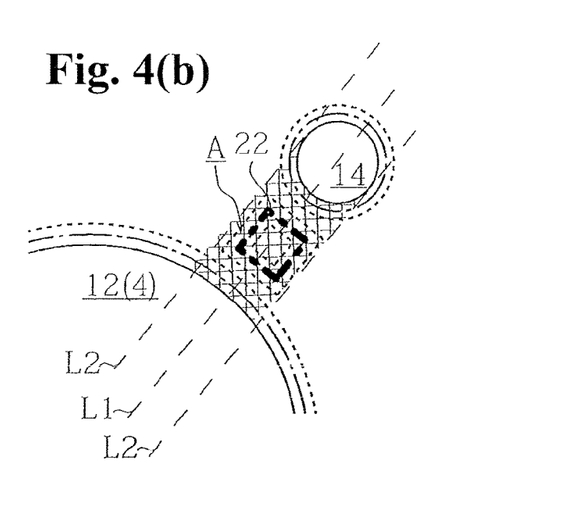
Figure 4C:
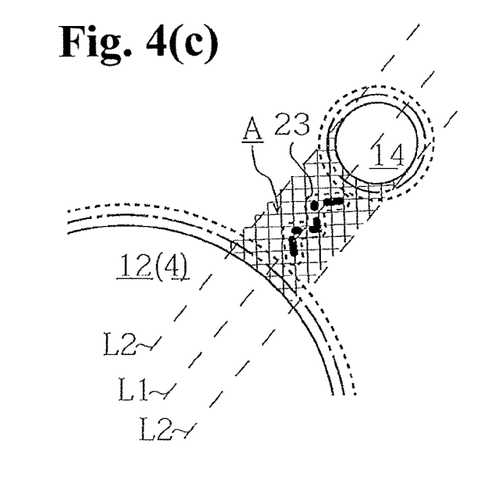
Figure 4D:
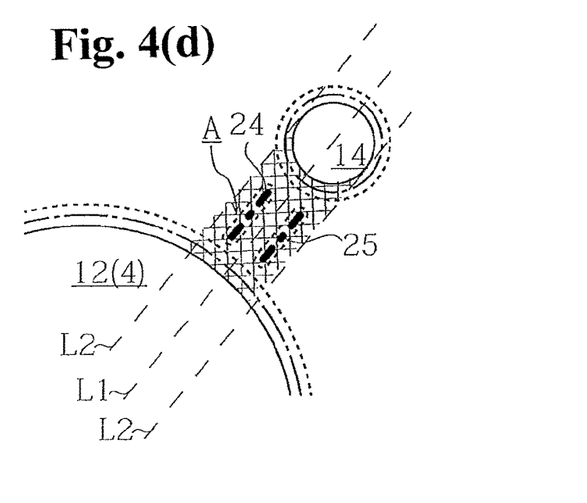

Additionally, as fastening-stress reduction beads 23 in FIG. 4(c), the fastening-stress reduction beads 23 may not be arranged linearly in the plan view, and may be meandered in a W shape, an S shape, or the like. Moreover, as fastening-stress reduction beads 24 and 25 shown in FIG. 4(d), a plurality of the fastening-stress reduction beads 18 may be provided in one fastening-stress concentration area A.

As mentioned above, the fastening-stress reduction portions can be formed in the beads or shims having various shapes, and be disposed in the fastening-stress concentration area A. However, preferably, for example, as shown in FIG. 1, each fastening-stress reduction beads 18 may be arranged radially relative to the cylinder-bore hole 12. More preferably, as shown in FIG. 2, the fastening-stress reduction beads 18, whose cross-sectional shape is an arbitrary shape and which are formed in a linear shape in the plan view, may be disposed on the head-bolt axis line L1 connecting the center O of the cylinder-bore hole 12 and the center P of the bolt hole 14.

If the fastening-stress reduction beads 18 formed linearly are disposed on the head-bolt axis line L1, they can be easily manufactured, and have a great effect reducing the fastening stress as well. Incidentally, in the embodiment, four bolt holes 6 are provided relative to one cylinder bore 4, so that the head-bolt axis line L1 connecting the center O of the cylinder-bore hole 12 and the center P of the bolt hole 14 exactly becomes a diagonal line of a polygonal shape which has the center P of each bolt hole 14 enclosing one cylinder-bore hole 12 at the top. The fastening-stress reduction beads 18 are provided on the diagonal line thereof so as to reduce the fastening stress generated between all the bolt holes 14 and the cylinder-bore holes 12 provided around the cylinder-bore holes 12.

On the other hand, the fastening-stress reduction beads 18 can not block the surface pressure of the cylinder-bore hole beads 15, the water hole beads 16, and the bolt hole beads 17, so that, for example, as shown in FIG. 4(a), if the fastening-stress reduction beads 21 are provided by displacing the fastening-stress reduction beads 21 from the head-bolt axis line L1, a clearance between the cylinder-bore hole beads 15, the water hole beads 16, and the bolt hole beads 17 can be obtained so as to be capable of preventing the surface pressure from being blocked.

According to the aforementioned configuration, in the fastening-stress concentration areas A of the cylinder head gasket 10 clamped between the cylinder block 2 and the cylinder head 3, there is provided the fastening-stress reduction beads 18 to become a resistance when the cylinder block 2 and the cylinder head 3 are fastened by the head bolts 1, and the fastening stress when the cylinder block 2 and the cylinder head 3 are fastened by the head bolts 1 is reduced so as to be capable of controlling the distortion or the deformation of the cylinder bore 4, or a cylinder liner which is not shown in the figures due to the fastening stress.

Especially, as explained in the aforementioned embodiment, the fastening stress of the closed-deck-type cylinder block 2 is reduced, and the distortion, the deformation, or the like of the cylinder bore 4 or the cylinder liner can be controlled, so that the shape of a cylinder is maintained, and an unnecessary resistance is not allowed to be generated in the cylinder bore 4 and a piston (not shown in the figures) inside the cylinder so as to be capable of improving fuel consumption.

Incidentally, a material of the metal plates forming the substrate 11 of the cylinder head gasket 10, and the number of the metal plates are not limited, and for example, the metal plates forming the substrate 11 may be configured by one sheet of the metal plate instead of a plural number.

Next, an intake-and-exhaust-system gasket 30 of the embodiment according to the present invention will be explained with reference to FIGS. 5(a) and 5(b). As shown in FIG. 5(a), the intake-and-exhaust-system gasket 30 comprises an exhaust-gas hole 32 and bolt holes 33 in a substrate 31 formed by one sheet or a plurality of the metal plates, and exhaust-gas hole beads 34 and bolt hole beads 35 are respectively provided in circumferential edge portions thereof.

Then, in fastening-stress concentration areas B that are enclosed by two bolt-hole tangent lines L4 of the bolt hole 33 parallel to a head-bolt axis line L3 connecting a center Q of the exhaust-gas hole 32 and a center R of the bolt hole 33; an outer circumferential edge (in the case of the embodiment, indicating the exhaust-gas hole beads 34) of the exhaust-gas hole 32; and an outer circumferential edge (in the case of the embodiment, indicating the bolt hole beads 35) of the bolt hole 33, fastening-stress reduction beads 36 are formed.

The fastening-stress reduction beads 36 provided in the fastening-stress concentration areas B are formed in the shape explained in the fastening-stress reduction beads 18 provided in the fastening-stress concentration areas A of the first embodiment, and the like. The fastening-stress reduction beads 36 do not block the surface pressure of the exhaust-gas hole beads 34, and the bolt hole beads 35 so as to be capable of reducing the fastening stress in the fastening-stress concentration areas B.

In the embodiment, there have been illustrated an example, as shown in FIG. 5(a), wherein three bolt holes 33 are provided, and the substrate 31 is formed in a triangle shape, or an example, as shown in FIG. 5(b), wherein two bolt holes 33 are provided, and the substrate 31 is formed in a rhombus shape. However, in the present invention, the shape of the substrate 31 or the number of the bolt holes 33 are not limited.

Incidentally, as for the embodiment of the present invention, there have been explained the cylinder head gasket 10 and the intake-and-exhaust-system gasket 30 as an example. However, the present invention can be applied provided that the gasket is a gasket clamped between two members fastened by a fixture such as a bolt and the like. For example, the present invention can be applied to a transmission, a gasket for a clutch cover, and the like.

The gasket of the present invention reduces the fastening stress generated when the two members are fastened by the fixture, and can control the distortion, the deformation, and the like due to the fastening stress so as to be capable of being used for sealing a closed-deck-type engine, wherein the cylinder bore is going to be distorted due to the fastening stress especially when the two members are fastened.

The disclosure of Japanese Patent Application No. 2012-268199, filed on Dec. 7, 2012, is incorporated in the application.

While the invention has been explained with reference to the specific embodiments of the invention, the explanation is illustrative and the invention is limited only by the appended claims.

What is claimed is:

1. A gasket adapted to be clamped between two members fastened by fixtures, comprising;
   a first metal plate forming the gasket;
   a second metal plate laminated with the first metal gasket;
   fixture holes formed in the first and second metal plates, for inserting the fixtures therein and passing the fixtures therethrough;
   sealing subject holes formed in the first and second metal plates;
   a sealing bead formed on the first metal plate around one sealing subject hole, and fixture hole beads formed around the fixture holes,
   fastening-stress concentration areas located on the first metal plate between the fixture holes and the one sealing subject hole where fastening stresses concentrate when the two members are fastened by the fixtures; and
   linear beads formed on the first metal plate only at the fastening-stress concentration areas to reduce the fastening stresses when the two members are fastened, each of the linear beads projecting to a side opposite to the second metal plate not to contact the second metal plate, and being disposed on an axis line connecting a center of one fixture hole and a center of the one sealing subject hole in the first metal plate, one linear bead being located between the sealing bead and the one fixture hole bead without connecting thereto,
   wherein one fastening-stress concentration area includes an area on the first metal plate enclosed by two tangent lines of the one fixture hole parallel to the axis line connecting the center of the one fixture hole and the center of the sealing subject hole; an outer edge of the one fixture hole; and an outer edge of the sealing subject hole, and
   the fixture holes are arranged outside the one sealing subject hole such that each of the fixture holes has one axis line connecting the center of the one sealing subject hole and the center of each of the fixture holes to thereby form a plurality of axis lines on the first metal plate, the axis lines being arranged relative to the center of the one sealing subject hole, respectively, the one linear bead being located only in the one fastening-stress concentration area and extending along each of the axis lines.

2. A gasket according to claim 1, wherein each of the first and second metal plates has four fixture holes arranged outside the sealing subject holes such that two of the axis lines are arranged diagonally relative to the center of the one sealing subject hole, respectively.

3. An engine comprising:
   a cylinder block;
   a cylinder head; and the gasket according to claim 1,
wherein the gasket is clamped between the cylinder block and the cylinder head.

4. A gasket according to claim 1, wherein only one linear bead is located between the sealing bead and the one fixture hole bead.

\* \* \* \* \*

UNITED STATES PATENT AND TRADEMARK OFFICE
CERTIFICATE OF CORRECTION

PATENT NO. : 10,113,505 B2  
APPLICATION NO. : 14/807492  
DATED : October 30, 2018  
INVENTOR(S) : Kisho Yasuda

Page 1 of 1

It is certified that error appears in the above-identified patent and that said Letters Patent is hereby corrected as shown below:

On the Title Page

Item (30) Foreign Application Priority Data, from "... 2012-268119" to --... 2012-268199--.

Signed and Sealed this  
Twenty-third Day of April, 2019

Andrei Iancu  
*Director of the United States Patent and Trademark Office*